(No Model.)

L. WHITE.
JOINT FOR HOLLOW SHELLS, &c.

No. 406,683. Patented July 9, 1889.

WITNESSES:
N. R. Davis
C. Sedgwick

INVENTOR:
L. White
BY Munn & Co
ATTORNEYS.

UNITED STATES PATENT OFFICE.

LYMAN WHITE, OF WATERBURY, CONNECTICUT, ASSIGNOR TO RANDOLPH & CLOWES, OF SAME PLACE.

JOINT FOR HOLLOW SHELLS, &c.

SPECIFICATION forming part of Letters Patent No. 406,683, dated July 9, 1889.

Application filed November 22, 1888. Serial No. 291,569. (No model.)

*To all whom it may concern:*

Be it known that I, LYMAN WHITE, of Waterbury, in the county of New Haven and State of Connecticut, have invented a new and useful Joint for Hollow Shells, &c., of which the following is a full, clear, and exact description.

My invention relates to an improved joint for tubes, hollow cylinders, or shells, as house-boilers, ammonia-receivers, soda and gas tanks, &c., and has for its object to provide a means whereby a simple and durable joint will be obtained and wherein the joints may be conveniently and expeditiously made.

The invention consists in the combination, with opposing cylinder-sections having their contiguous ends turned inward at an angle, of an interior peripherally-grooved tie-ring and an exterior locking-ring, and in the novel construction and combination of the several parts, as will be hereinafter fully set forth, and pointed out in the claims.

Reference is to be had to the accompanying drawings, forming a part of this specification, in which similar letters of reference indicate corresponding parts in all the figures.

Figure 1:
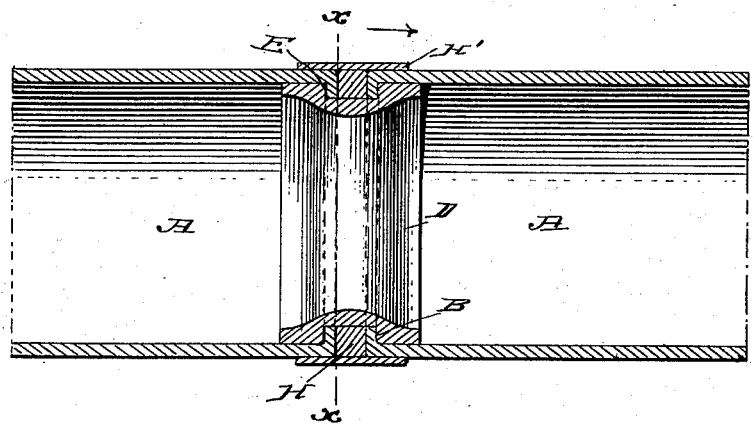
Figure 2:
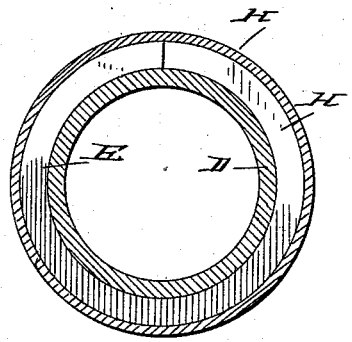

Figure 1 is a partial vertical longitudinal section through two tube or cylinder sections connected with my improved joint; and Fig. 2 is a transverse vertical section taken on line *x x* of Fig. 1, looking in direction of the arrow.

In carrying out the invention a ring D is provided adapted to be located upon the inner surface of the cylinder, the outer face of which ring, preferably at the center, is provided with a peripheral groove E, as best illustrated in Fig. 1, and the central inner surface of the ring D is bulged outward or thickened, in order to compensate for the metal removed in producing the groove E.

The opposing sections of the cylinder, tube, or shell to be united are turned inward and downward at a right angle within the ring-recess to form an annular integral flange B, which flange may be produced by rolling the metal down or manipulating the end of the cylinder-sections in any approved manner; or, if in practice it is found desirable, the flange may be attached to the cylinder without departing from the spirit of the invention.

The flanges B of the opposing cylinder-sections D are entered in the ring-groove E so that the inner surface of the several flanges will be in contact with the vertical walls of the said groove, and the ring is so formed upon the said outer face that the said outer face will conform to the inner contour of the cylinder-sections, as is clearly shown in Fig. 1.

The groove E in the ring D, which, for convenience, I designate a "tie-ring," is of sufficient width to leave a convenient space between the contiguous faces of the flanges B when located in the groove. This space is filled by the lock-ring H, the said ring being so formed by crowding or compressing a bar of metal in the space intervening the flanges and the cylinder-sections, which may be accomplished in any suitable and well-known manner, the bar being of sufficient length only to permit the two ends of the same to be brought in close contact, as illustrated in Fig. 2. This locking-ring H is then soldered, brazed, or otherwise rigidly secured to the cylinder-sections. The locking-ring is preferably made of such thickness that when placed in position the outer surface of the ring will be flush with the outer face of the cylinder-sections, or essentially so.

If in practice it is found desirable, a band H' may be secured to the cylinder-sections and to the locking-ring, effectually concealing or covering the joint, as best shown in Fig. 1.

Having thus described my invention, I claim as new and desire to secure by Letters Patent—

1. The combination, with opposing cylinder-sections having their contiguous ends turned inward at an angle, of an interior peripherally-grooved tie-ring, a locking-ring, and an external cover or strengthening-band, substantially as shown and described.

2. The combination, with opposing cylinder-sections having their ends turned inward at an angle to form a flange, of an internal supporting tie-ring provided with a peripheral groove adapted to receive the flanges of the cylinder-sections, and a locking-ring also entered into the groove of the tie-ring between said flanges and in contact therewith, all combined for operation substantially as shown and described.

LYMAN WHITE.

Witnesses:
L. W. KELLOGG,
JOHN P. KELLOGG.